(12) United States Patent
Vazquez

(10) Patent No.: US 10,384,706 B1
(45) Date of Patent: Aug. 20, 2019

(54) STROLLER COVER

(71) Applicant: Efrain Vazquez, New York, NY (US)

(72) Inventor: Efrain Vazquez, New York, NY (US)

( * ) Notice: Subject to any disclaimer, the term of this patent is extended or adjusted under 35 U.S.C. 154(b) by 0 days.

(21) Appl. No.: 15/881,176

(22) Filed: Jan. 26, 2018

(51) Int. Cl.
| | | |
|---|---|---|
| *B62B 9/14* | (2006.01) | |
| *E04H 15/14* | (2006.01) | |
| *E04H 15/02* | (2006.01) | |
| *F04D 25/06* | (2006.01) | |
| *F04D 17/08* | (2006.01) | |

(52) U.S. Cl.
CPC ............ *B62B 9/142* (2013.01); *E04H 15/02* (2013.01); *E04H 15/14* (2013.01); *B01D 2279/50* (2013.01); *B62B 2204/04* (2013.01); *F04D 17/08* (2013.01); *F04D 25/0673* (2013.01)

(58) Field of Classification Search
None
See application file for complete search history.

(56) References Cited

U.S. PATENT DOCUMENTS

| | | | | |
|---|---|---|---|---|
| 4,947,883 | A * | 8/1990 | Mayo ................... | B60N 2/2839 135/90 |
| 6,012,756 | A | 1/2000 | Clark-Dickson | |
| 6,027,137 | A * | 2/2000 | Rura ....................... | A47C 7/66 261/DIG. 3 |
| 6,068,322 | A | 5/2000 | Kuester | |
| 6,217,099 | B1 | 4/2001 | McKinney et al. | |
| 6,409,206 | B1 * | 6/2002 | Willrich .................... | B62B 9/00 261/DIG. 3 |
| 7,150,162 | B1 * | 12/2006 | Brunner ..................... | B62B 9/00 62/306 |
| 7,886,548 | B1 * | 2/2011 | Graves ..................... | B62B 9/00 62/272 |
| 2006/0082183 | A1 * | 4/2006 | Hudson ..................... | B62B 9/14 296/77.1 |
| 2007/0018415 | A1 * | 1/2007 | Koch ....................... | B62B 9/142 280/47.38 |
| 2008/0012258 | A1 * | 1/2008 | Townsend ............... | A61G 10/02 280/47.38 |
| 2008/0084040 | A1 * | 4/2008 | McGowan ................ | B62B 9/00 280/47.38 |
| 2009/0261137 | A1 * | 10/2009 | Nooshin .................. | A61G 5/10 224/539 |

(Continued)

FOREIGN PATENT DOCUMENTS

| | | | |
|---|---|---|---|
| KR | 20110136394 A | * 12/2011 | |
| KR | 101556375 B1 | * 10/2015 | |
| WO | WO-2008010209 A2 | * 1/2008 | ............... B62B 9/14 |

*Primary Examiner* — David R Dunn
*Assistant Examiner* — Danielle Jackson
(74) *Attorney, Agent, or Firm* — Baker Botts L.L.P.

(57) ABSTRACT

The presently disclosed subject matter provides an apparatus for protecting an occupant in a stroller from harmful environmental factors including UV and air pollutants. The apparatus can include an interchangeable cover configured to substantially enclose the occupant and cover at least a portion of the stroller to form an enclosure. The interchangeable cover can include a flexible plastic film that protects the occupant from UV radiation. The interchangeable cover can have an inlet, a fan connected to the inlet to draw ambient air into the enclosure, and a filter unit configured to filter the ambient air. The fan is further configured to blow the filtered ambient air along an interior surface of the enclosure and to maintain a positive air pressure within the enclosure.

20 Claims, 3 Drawing Sheets

(56) References Cited

U.S. PATENT DOCUMENTS

| | | | | |
|---|---|---|---|---|
| 2013/0162396 A1* | 6/2013 | Yang | ........................ | B60L 15/20 |
| | | | | 340/5.81 |
| 2014/0097652 A1* | 4/2014 | Minkoff | ................. | A47C 7/744 |
| | | | | 297/180.14 |
| 2014/0319886 A1* | 10/2014 | Coffman | ................. | A47D 15/00 |
| | | | | 297/180.14 |
| 2015/0115669 A1* | 4/2015 | Kagan | ................... | B60N 2/5678 |
| | | | | 297/180.12 |
| 2016/0199241 A1* | 7/2016 | Rapoport | ............... | A61G 11/00 |
| | | | | 600/22 |
| 2018/0264390 A1* | 9/2018 | Kim | ........................ | B01D 46/00 |

* cited by examiner

STROLLER COVER

BACKGROUND

Infants and children are generally more susceptible than adults to harmful effects from the environment such as sun rays and air pollutants.

Ultraviolet (UV) radiation is a form of electromagnetic radiation that can be found in sunlight. High energy UV rays often have enough energy to ionize an atom or molecule and can damage DNA in the cells of our body, which in turn may lead to cancer. An infant's skin possesses little melanin, the pigment that gives color to skin, hair and eyes and provides some sun protection. Accordingly, infants and young children are especially susceptible to the sunlight's damaging effects. As human activities continue to reduce the thickness of the ozone layer, which shields earth from sun's UV radiation, the level of harmful sun rays continues to rise over last three decades. UV protection of infants and young children has become an important issue.

Human activities and industrialization also impact ambient air quality, which substantially affects infants' and children's health. Infants and children generally breathe more rapidly than adults. This increases their exposure to pollutants in the air. Infants and children often breathe through their mouths, bypassing the filtering effect of the nose and allowing more pollutants to be inhaled. Additionally, children and infants are more susceptible to the health effects of air pollution because their immune systems and developing organs are still immature. Exposure to toxic air contaminants during infancy or childhood could affect the development of the respiratory, nervous, endocrine and immune systems, and could increase the risk of cancer later in life.

Conventional strollers generally adopt an open design such that an occupant of the stroller is directly exposed to the harmful environmental factors. While certain strollers can have a partial shade cover that can protect the occupant from sunlight from a high angle (i.e. overhead sunlight), such shade cover generally offers little protection from scattered sunlight and sunlight from a low angle. U.S. Pat. No. 6,012,756 to K. J. Clark-Dickson ("Clark-Dickson") discloses a flexible UV protective cover made from knitted fabric. While the UV protective cover offers more UV protection over a convention stroller with a hood or shade, a large portion of the UV protective cover is not transparent to visible light and thus partially blocks the occupant's view. Furthermore, the cover disclosed in Clark-Dickson does not protect the occupant from air pollutants. U.S. Pat. No. 6,217,099 to McKinney et al. ("McKinney") discloses a multi-layer protective shield for a stroller. While the protective shield offer protection against sun, rain, wind, and insects, it does not protect the occupant from air pollutants. U.S. Pat. No. 6,068,322 to Kuester ("Kuester") discloses personal protection for infants against air pollution. Kuester discloses a substantially enclosed stroller design that includes a powered filter-unit mounted on the frame of the stroller that flows filtered air towards the occupant of the stroller. However, the stroller design of Kuester cannot be readily implemented in an interchangeable stroller cover, i.e., a stroller cover that can be adjusted to fit on different strollers. Furthermore, the stroller is not designed to provide UV protection to its occupant.

Accordingly, there is a need for an interchangeable stroller cover that offers protection against both sunlight and air pollutants.

SUMMARY

The presently disclosed subject matter provides an apparatus for protecting an occupant in a stroller from harmful environmental factors including UV light and air pollutants. An exemplary apparatus can include an interchangeable cover configured to substantially enclose the occupant and cover at least a portion of the stroller to form an enclosure. According to one aspect of the disclosed subject matter, the interchangeable cover can have an inlet, a fan connected to the inlet to draw ambient air into the enclosure, and a filter unit configured to filter the ambient air. More specifically, the fan is configured to blow the filtered ambient air along an interior surface of the enclosure and to maintain a positive air pressure within the enclosure.

The interchangeable cover can include a flexible plastic film. The flexible plastic film can protect the occupant from UV radiation. In certain embodiments, the flexible plastic film can block 90% to 100% UV radiation. The flexible plastic film can be substantially transparent to visible light, allowing the occupant to see through the interchangeable cover. Under bright sunlight, the flexible plastic film can reduce its transparency. In certain embodiments, the flexible plastic film can be substantially of a single color. The single color can preferably be yellow, blue, or pink. In certain embodiments, the plastic film can have a thickness between 2 and 30 mils.

In certain embodiments, the fan can be battery operated. The fan can be a centrifugal fan with concealed blades. In certain embodiments, the fan can provide a pressure ratio of 1.1 or higher. The filter unit to provide filtered air can include a HEPA filter. In certain embodiments, the fan can be positioned at a side of the stroller.

According to another aspect of the disclosed subject matter, the disclosed apparatus can include a humidifier unit to improve moisture level in the filtered air supplied to the occupant of the stroller. The disclosed apparatus can further include a humidity sensor to determine the humidity within the enclosure of the interchangeable cover. Additionally, a controller can be configured to control the humidifier unit based on the input from the humidity sensor.

In certain embodiments, the disclosed apparatus can include a temperature sensor configured to measure temperature within the enclosure. A controller can be configured to control the fan based on the input from the temperature sensor. Additionally, the controller can be configured to trigger an alarm when the input from the temperature sensor exceeds a predetermined value.

DETAILED DESCRIPTION

The presently disclosed subject matter provides an apparatus for protecting an occupant within a stroller. This apparatus can protect an occupant, for example an infant or a child, from various hazards from the environment including UV irradiation and pollutants from the ambient air.

Figure 1:
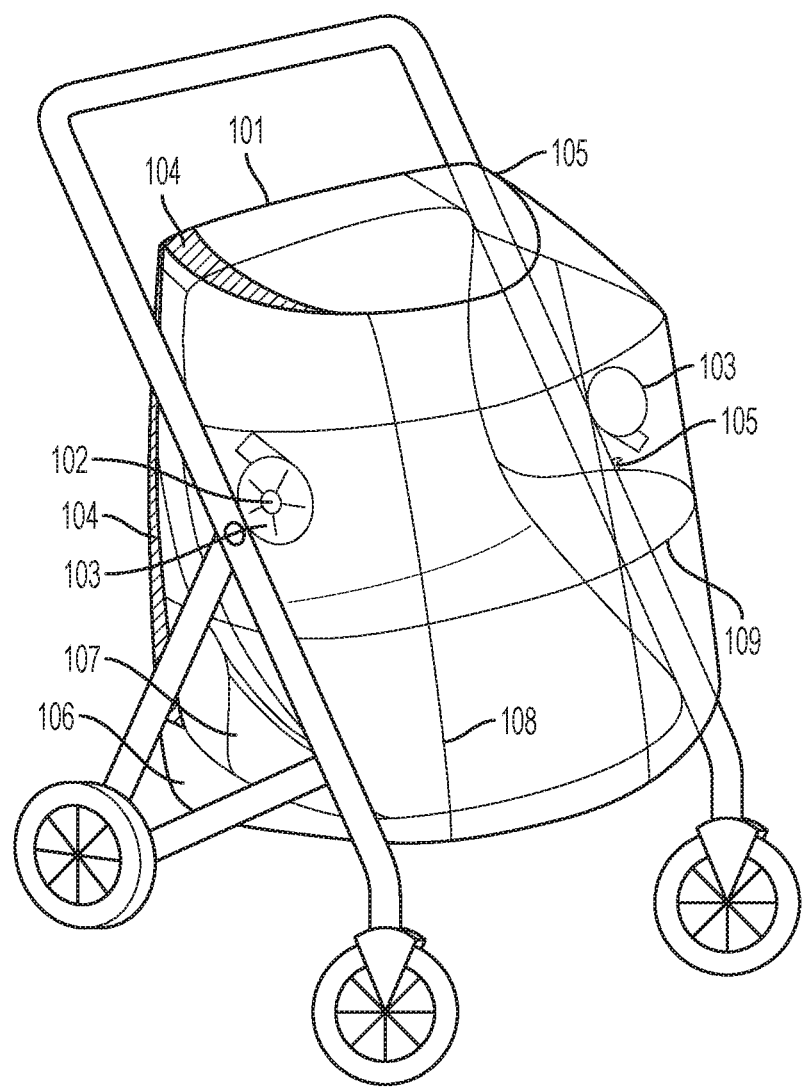
FIG. 1. provides a perspective view of an exemplary apparatus in accordance with the disclosed subject matter.

For the purpose of illustration and not limitation, FIG. 1 shows an exemplary apparatus of the presently disclosed subject matter. The exemplary apparatus includes an interchangeable cover 101 that is designed to be placed over and to fit strollers of different designs or dimensions. The interchangeable cover 101 can substantially enclose the occupant and cover at least a portion of the stroller to form an enclosure. The interchangeable cover 101 can further have an inlet 102 to allow a fan 103 to draw and filter ambient air into the enclosure and to maintain a positive air pressure within the enclosure.

The interchangeable cover 101 can be adapted to match the general contour of a typical stroller and provide adjustable portions 104 of the cover to match the shape and size of the stroller. For example, such adjustable portions 104 of the cover can be achieved by attaching hook and loop fastener strips to portions of the covers to vary the dimension of the enclosure as necessary. Such adjustable portions 104 can also be achieved by other means including buttons, pins, clips, zippers, and adhesive surfaces. Accordingly, the interchangeable cover 101 can be removed from one stroller and be applied to a different stroller. This interchangeability can have economic advantages as it not only expands the applicable market of such an apparatus but also provides considerable cost savings for a consumer, who may possess more than one stroller.

In certain embodiments, the interchangeable cover 101 can substantially enclose the occupant and the stroller, forming an enclosure with restricted ingress and egress of air flow to a degree that a positive pressure within the enclosure can be maintained using a suitable pressurizing means such as a fan. In certain embodiments, the cover 101 can have an apron portion 106 that reduces the clearance between a base portion 107 of the stroller and the cover, thereby restricting the ingress of air flow. In certain embodiments, the interchangeable cover 101 can further include fastening means 105 to secure the cover to the stroller. Such fastening 105 means can include pins, hooks, clips, ties, and buttons to secure the cover to the stroller frame so that the cover may not shift during movements of the stroller and can withstand windy conditions. Such fastening means 105 can also assist in forming the enclosure with restricted ingress of air, for example, by narrowing the opening of the apron section. The locations of the fastening 105 means are not necessarily limited but preferably incorporated at corners and edges of the interchangeable cover 101.

In certain embodiments, the interchangeable cover 101 can include a flexible plastic film of suitable thickness and materials. The term plastic is used herein to loosely refer to a polymer based material with a good flexibility and mechanical strength at room temperature. Such common polymers as polyethylene, polypropylene, polyvinyl chloride, polyesters, polyurethane can be used. Polymer blends of suitable compositions can also be used so long as the material provides a good flexibility and mechanical strength. Such polymer or polymer blends are generally water resistant. Accordingly, the interchangeable cover 101 can provide protection against rain. Preferably, the polymer or polymer blends have good transparency to visible light. More preferably, the polymer or polymer blends have a transmittance of better than 50% in the visible range, more preferably better than 70%. In this way, an infant siting in a stroller within the interchangeable cover 101 can see through the plastic film so that he can observe and interact with the surrounding environment. In certain embodiments, the flexible plastic film can be relatively thick in order to provide sufficient mechanical strength to allow the interchangeable cover to withstand wear and tear. A thicker plastic film can also resist a stronger wind and provide better thermal insulation. Preferably, the thickness of the plastic film is more than 2 mils, more preferably between 2 mils and 30 mils.

In certain embodiments, the plastic film can contain UV absorbing components. Such UV absorbing components can be built into the polymer structure, or be introduced as an additive. Such UV absorbing components can include known UV absorbing dyes or pigments. For example, UV absorbing pigments can include UV absorbing nanoparticles such as zinc oxide nanoparticles. In certain embodiments, the plastic film can block more than 90% UV, more than 95% UV, and preferably more than 98% UV. This UV blocking characteristic of the plastic film can provide protection to the occupant of a stroller from harmful UV radiation of sunlight.

In certain embodiments, the plastic film can have a single color. A single color generally can offer a sense of security and can be appropriate for the early vision development for infants and children. The color can preferably be one of blue, pink, or yellow. More preferably, the single color can be yellow.

In certain embodiments, the plastic film can also respond to bright sunlight by reducing visible light transmission and can revert to a transparent state in the absence of strong sunlight. This characteristic of the plastic film reduces the brightness of outdoor sunlight and can help to create a comfortable environment for an infant within the stroller cover. This can be achieved by adding known organic photochromic molecules to the plastic film. Such organic photochromic molecules include oxazines and naphthopyrans. In certain embodiments, the plastic film can be made of multilayer structures and the organic photochromic molecules can be added to a thin outer layer of the multilayer structures. In such an arrangement, heat converted from absorption of sunlight can be confined to the outer layer, thereby preventing excessive temperature increase inside the enclosure. Other suitable additives such as antimicrobials, flame retardants, and process aids can also be added to the plastic film.

In certain embodiments, the interchangeable cover 101 can further include structure strengthening elements such as vertical strut 108 and horizontal ribs 109. Such strengthening elements can be constructed using known suitable lightweight and high strength materials including plastics and metals. In certain embodiments, metal wires coated with plastic can be used as structure strengthening elements. In certain embodiments, the strengthening elements can employ a tubular or inflatable designs known in the art. Such strengthening elements can further maintain the overall shape of the enclosure so that the occupant has a sufficient free space within the enclosure.

In certain embodiments, the interchangeable cover 101 can include an inlet 102 to allow clean air to be introduced into the enclosure. This inlet 102 can include an opening of any suitable shape and size to form a substantially sealed interface with a means for introducing clean air into the enclosure. Preferably, this opening is a round shape of about 1 to 3 inches in diameter. Alternatively, this opening can be a rectangle shape, preferably having an area larger than 2 square inches. In certain embodiments, the opening is placed at one side of the stroller cover, substantially away from the forward view of the occupant.

In certain embodiments, the means for introducing clean air into the enclosure can include a fan 103. The fan 103 can be directly attached to the opening and fit inside of the enclosure. The fan 103 is configured to provide a sufficient air flow to maintain a positive pressure within the enclosure.

Figure 2:
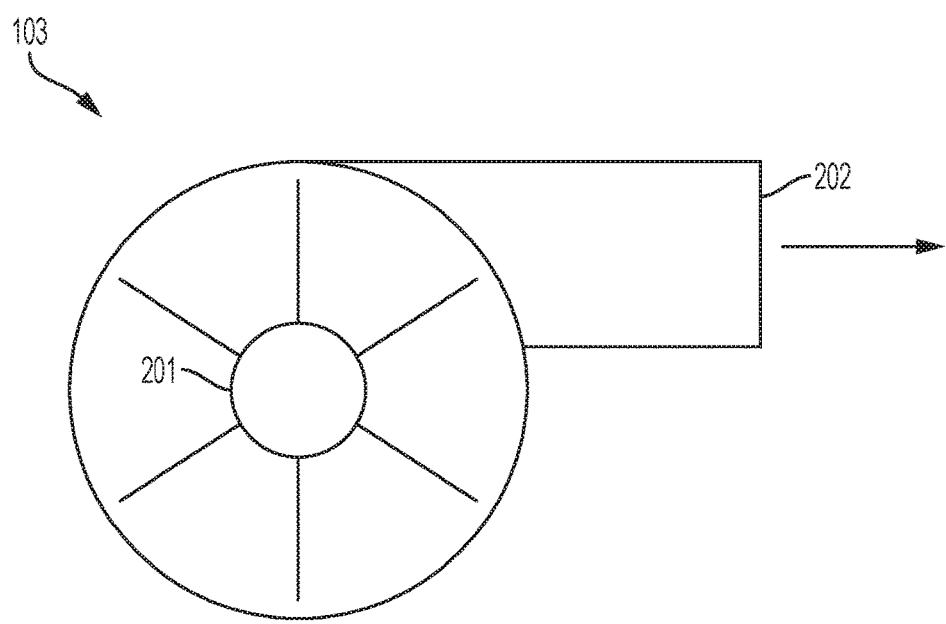
FIG. 2. shows a side view of an exemplary centrifugal fan.
Figure 3:
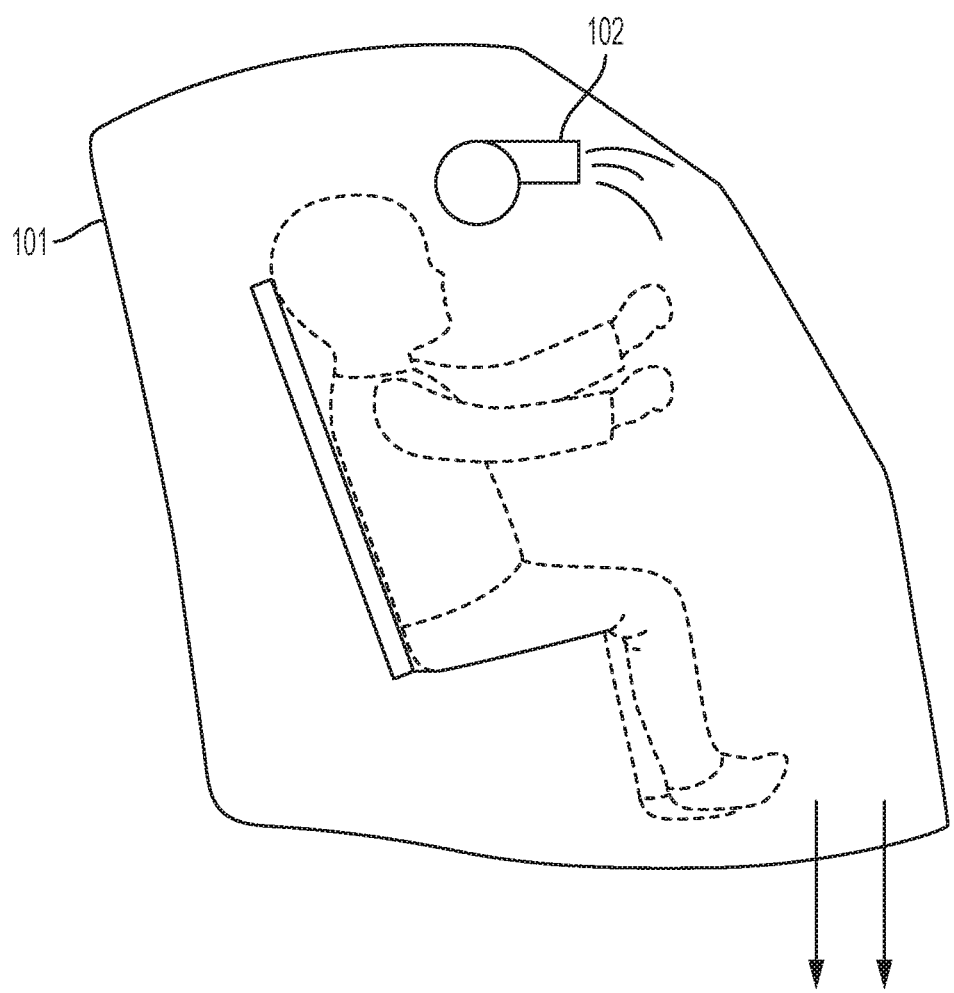
FIG. 3. shows an exemplary arrangement of a centrifugal fan within an interchangeable stroller cover.

In certain embodiments, the fan 103 can provide a pressure ratio of 1.1 or higher. The fan 103 can have a relative low weight, preferably a weight of less than 1 lb. In this way, the fan 103 can be directly attached to the opening of the interchangeable cover without causing substantial change to the shape of the enclosure. As described above, structure strengthening elements can be properly positioned to further support the weight of the fan. In certain embodiments, the fan 103 can be a type of centrifugal fan. FIG. 2. shows a side view of an exemplary centrifugal fan, where an air inlet 201 is located at the center of the fan and an outlet 202 is located at one side of the fan. The fan blades can be concealed and inaccessible by the occupant of the stroller so that the occupant will not inadvertently touch the spinning fan blades. In certain embodiments, the orientation of the outlet 202 can be adjustable so that the airflow from the outlet 202 can be directed as needed. As shown in FIG. 3, the outlet 202 of the fan 103 is directed along an interior surface of the interchangeable cover 101 to create a circulating airflow within the enclosure. Because the airflow is not directed towards the occupant of the stroller, such configuration minimizes the discomfort created by a forced airflow.

In certain embodiments, the fan 103 can be operated by a battery. The battery can be directly enclosed within the housing of the fan. Alternately, the battery can be located outside of the housing of the fan 103. For example, the battery can be secured on the body of the stroller and power the fan through an electrical connection.

In certain embodiments, the means for introducing clean air can further include an air filter unit, which is configured to remove contaminants and pollutants from the ambient air. In certain embodiments, the filter unit can be configured to remove smoke, dust particles, mold spores, pollens, and allergens. In certain embodiments, the filter can also reduce odors, volatile organic compounds, and certain germs. By this means, the occupant within the enclosure can breathe clean air substantially free of various air pollutants. This is particularly important for consumers in an urban environment, where the pollutant level can be high, and specially for infants who have pre-existing medical conditions and are prone to allergens. In certain embodiments, the filter unit can include a high-efficiency particulate air (HEPA) filter. In certain embodiments, the filter unit can be directly attached to the inlet 201 of the fan 103.

In certain embodiments, the means for introducing clean air can further include a humidifier unit to introduce moisture to dry ambient air. A properly controlled humidity level within the enclosure can help with dry skin and congestion experienced by an occupant in dry weather. Such humidifier unit can include a water reservoir and an evaporator mat. Water from the water reservoir can be introduced onto the evaporator mat through appropriate tubing and control system. The evaporator mat can be housed within the filter unit and in the path of the filtered air. In this way, the dry filtered air can pick up moisture from the evaporator mat, and the evaporator mat can further filter certain allergens from the airflow.

In certain embodiments, the presently disclosed apparatus for protecting an occupant within a stroller can include a humidity sensor that measures the humidity within the enclosure. The measured humidity values can be displayed on a digital panel attached to a top portion of the interchangeable cover 101. The digital panel is preferably located at a position readily viewable by a caregiver who attends to the stroller. In certain embodiment, the digital panel can be further connected to a controller that is configured to set desired humidity level and controls the humidifier to introduce a desirable amount of moisture into the enclosure.

In certain embodiments, the apparatus of the present disclosed subject matter can further include a temperature sensor that measures the temperature within the enclosure. The measured temperature values can also be displayed on the digital panel. In certain embodiments, the controller is configured to control the fan speed based on the measured temperature values. For example, the controller can increase fan speed when the measured temperature exceeds certain preset values. In certain embodiments, the controller can be connected to an alarm. When the measured temperature exceeds certain preset values, the controller can trigger the alarm to alert the caregiver the dangerous temperatures within the enclosure.

In certain embodiments, the interchangeable cover 101 can include additional inlets 102 to allow clean air to be introduced into the enclosure. As described above, similar means for introducing clean air can be implemented to such additional inlets 102. The outlets of the fan units can be directed to form a coordinated airflow pattern within the enclosure. For example, one fan outlet can be directed upward and backward along one side of the enclosure and another fan outlet can be directed downward and forward along the other side of the enclosure.

It will be apparent to those skilled in the art that various modification and variations can be made in the structure and method of the disclosed subject matter without departing from the spirit or scope of the disclosed subject matter. Thus, it is intended that the disclosed subject matter include modifications and variations that are within the scope of the appended claims and their equivalents.

The invention claimed is:

1. An apparatus for protecting an occupant in a stroller, comprising:
    an interchangeable cover configured to substantially enclose the occupant and cover at least a portion of the stroller to form an enclosure having an inlet;
    a centrifugal fan attached to the interchangeable cover and positioned inside the enclosure, and connected to the inlet to draw ambient air into the enclosure through an outlet of the centrifugal fan; and
    a filter unit configured to filter the ambient air;
    wherein, the outlet of the centrifugal fan is directed along an interior surface of the interchangeable cover such that air is not directed at the occupant and the centrifugal fan is configured to maintain a positive air pressure within the enclosure.

2. The apparatus of claim 1, wherein the interchangeable cover comprises a flexible plastic film.

3. The apparatus of claim 2, wherein the flexible plastic film protects the occupant from UV radiation.

4. The apparatus of claim 3, wherein the flexible plastic film blocks 90% to 100% UV radiation.

5. The apparatus of claim 2, wherein the flexible plastic film is substantially transparent to visible light.

6. The apparatus of claim 5, wherein the flexible plastic film is configured to reduce its transparency under direct sun light.

7. The apparatus of claim 5, wherein the flexible plastic film is substantially of a single color.

8. The apparatus of claim 7, wherein the single color is selected from a group consisting yellow, blue, and pink.

9. The apparatus of claim 2, wherein the plastic film has a thickness between 2 and 30 mils.

10. The apparatus of claim 1, wherein the centrifugal fan is battery operated.

11. The apparatus of claim 1, wherein the centrifugal fan has concealed blades.

12. The apparatus of claim 1, wherein the centrifugal fan provides a pressure ratio of 1.1 or higher.

13. The apparatus of claim 1, wherein the filter unit comprises a HEPA filter.

14. The apparatus of claim 1 further comprising a humidifier unit.

15. The apparatus of claim 14 further comprising a humidity sensor configured to determine the humidity within the enclosure.

16. The apparatus of claim 15 further comprising a controller configured to control the humidifier unit based on the input from the humidity sensor.

17. The apparatus of claim 1 further comprising a temperature sensor configured to measure temperature within the enclosure.

18. The apparatus of claim 17 further comprising a controller configured to control the centrifugal fan based on input from the temperature sensor.

19. The apparatus of claim 18 further comprising an alarm, wherein the controller is configured to trigger the alarm when the input from the temperature sensor exceeds a predetermined value.

20. The apparatus of claim 1, wherein the centrifugal fan is attached to a side of the interchangeable cover.

* * * * *